United States Patent
Harrison et al.

(10) Patent No.: US 11,258,343 B2
(45) Date of Patent: Feb. 22, 2022

(54) DOUBLE HELIX ACTUATOR WITH MAGNETIC SECTIONS HAVING ALTERNATING POLARITIES

(71) Applicant: Apple Inc., Cupertino, CA (US)

(72) Inventors: Jere C. Harrison, Mountain View, CA (US); Alex J. Speltz, San Francisco, CA (US); Xin Alice Wu, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 600 days.

(21) Appl. No.: 15/985,619

(22) Filed: May 21, 2018

(65) Prior Publication Data

US 2019/0356210 A1    Nov. 21, 2019

(51) Int. Cl.
*H02K 41/03* (2006.01)
*H02K 33/00* (2006.01)
*H02K 35/04* (2006.01)

(52) U.S. Cl.
CPC ............ *H02K 41/03* (2013.01); *H02K 33/00* (2013.01); *H02K 35/04* (2013.01); *H02K 2201/18* (2013.01)

(58) Field of Classification Search
CPC .. H02K 7/1869; H02K 7/1876; H02K 7/1892; H02K 33/00; H02K 33/02; H02K 33/16; H02K 33/18; H02K 41/03; H02K 41/031; H02K 2201/18; H02K 35/04
USPC ... 310/25, 15, 12.24–12.26, 81, 80, 321, 20, 310/21, 28–30, 36–37; 381/400–422
See application file for complete search history.

(56) References Cited

U.S. PATENT DOCUMENTS

| | | | | |
|---|---|---|---|---|
| 4,318,038 A * | 3/1982 | Munehiro | ............ | H02K 41/031 310/13 |
| 5,808,381 A * | 9/1998 | Aoyama | ................ | H02K 41/03 310/12.22 |
| 6,163,091 A * | 12/2000 | Wasson | .................. | H02K 41/03 310/12.19 |
| 7,576,454 B2 * | 8/2009 | Cheung | ................. | B82Y 25/00 310/12.12 |
| 8,188,622 B1 * | 5/2012 | Waters | ................... | H02K 35/04 310/15 |
| 9,325,219 B2 * | 4/2016 | Hunstable | ............. | H02K 35/04 |
| 10,277,154 B2 | 4/2019 | Chan et al. | | |
| 2003/0034697 A1 * | 2/2003 | Goldner | ............ | B60G 17/0157 310/17 |
| 2006/0028070 A1 * | 2/2006 | Sahin Nomaler | .... | H02K 41/031 310/12.22 |

(Continued)

FOREIGN PATENT DOCUMENTS

WO    2017/008085    1/2017

*Primary Examiner* — Maged M Almawri
(74) *Attorney, Agent, or Firm* — Fish & Richardson P.C.

(57) ABSTRACT

A double helix actuator is disclosed that includes a double helix coil wound around a movable proof mass that is enclosed within a magnetic structure. The double helix coil and the magnetic structure are arranged relative to each other so that the magnetic field generated by the entirety of the double helix coil contributes to a linear force direction of the actuator. The double helix actuator produces a greater linear force density compared to traditional racetrack coil actuators, where only a portion of the coil contributes to the linear force. The double helix actuator also produces torque in addition to linear force which allows the double helix to provide unique haptic sensations in a variety of applications.

8 Claims, 20 Drawing Sheets

(56) References Cited

U.S. PATENT DOCUMENTS

| | | | |
|---|---|---|---|
| 2012/0169149 A1* | 7/2012 | Yoon | B06B 1/045 |
| | | | 310/25 |
| 2012/0170792 A1* | 7/2012 | Li | H02K 33/16 |
| | | | 381/412 |
| 2020/0212786 A1* | 7/2020 | Ling | H02K 33/16 |
| 2020/0358347 A1* | 11/2020 | Nakamura | H02K 33/16 |
| 2020/0412226 A1* | 12/2020 | Ma | H02K 33/18 |

* cited by examiner

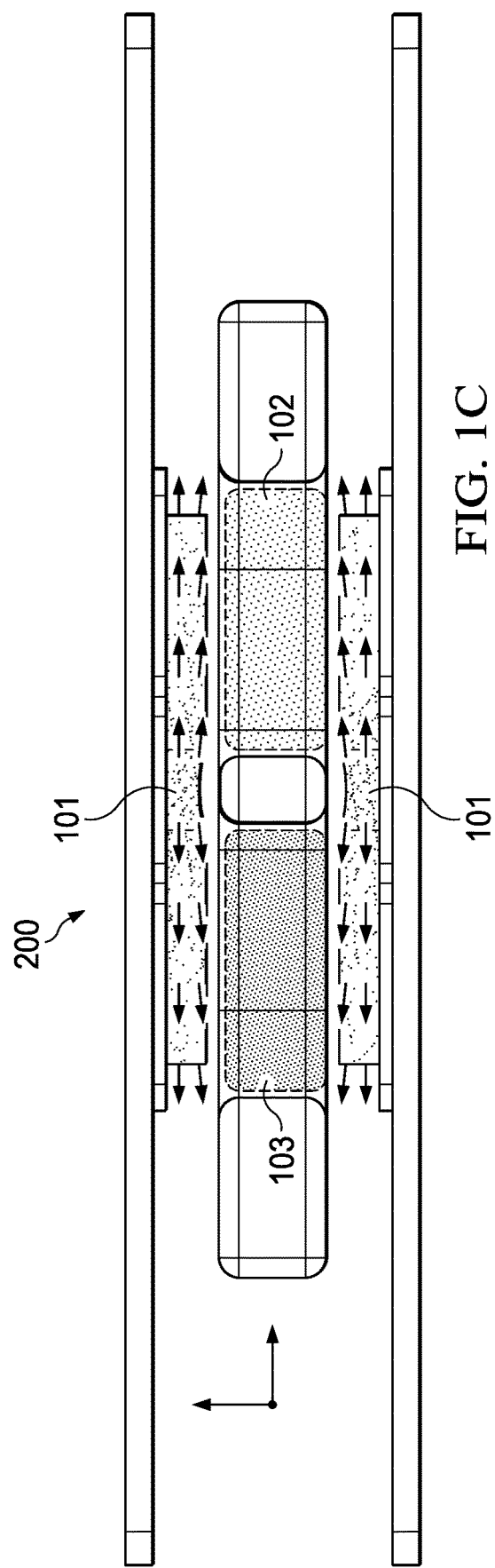

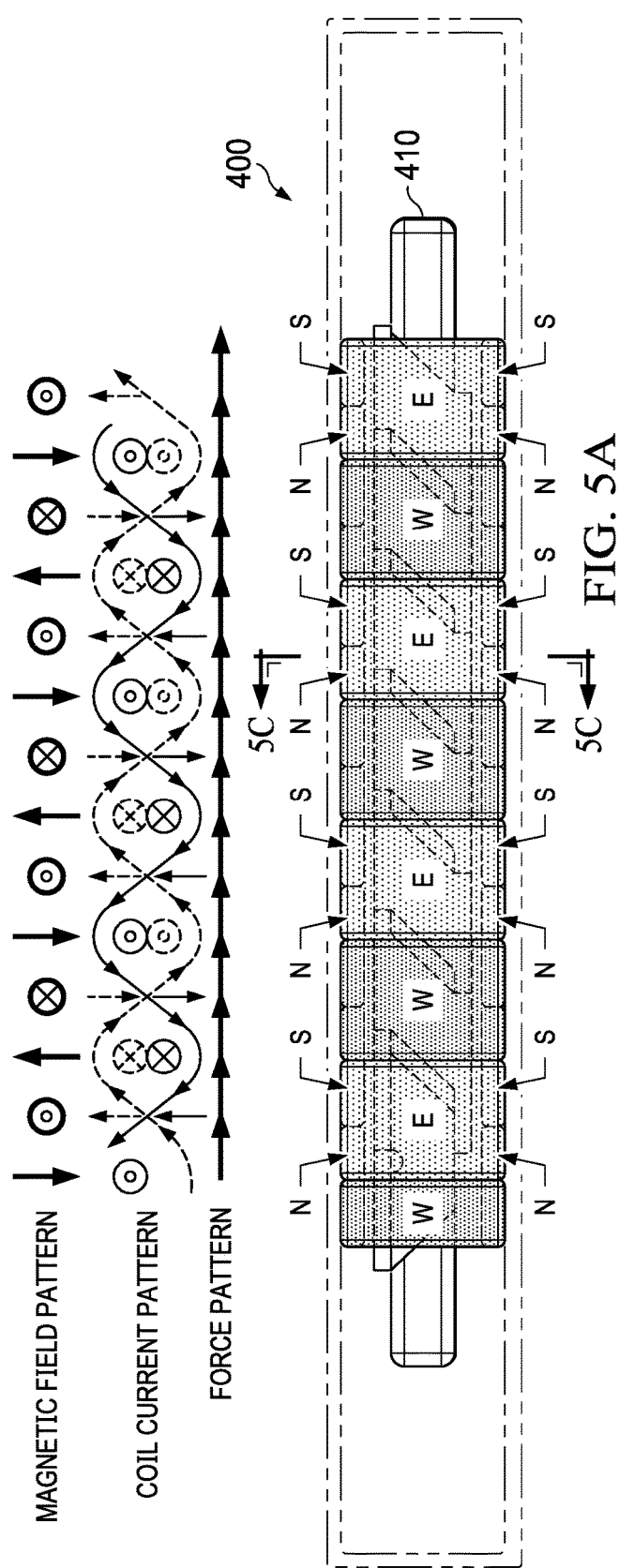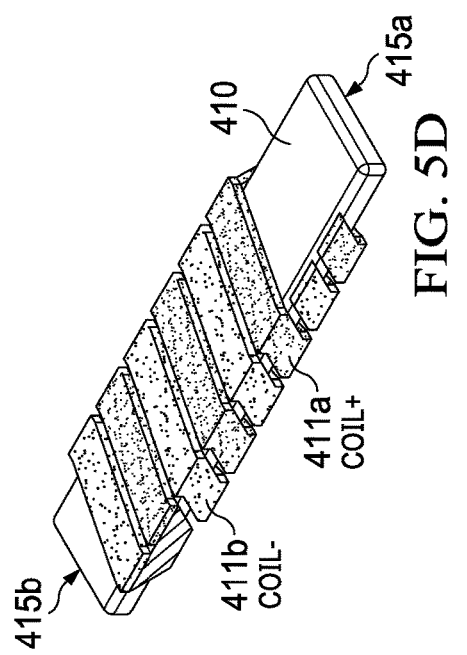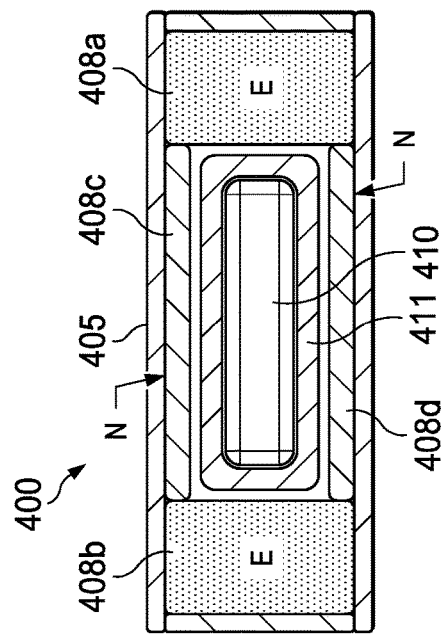

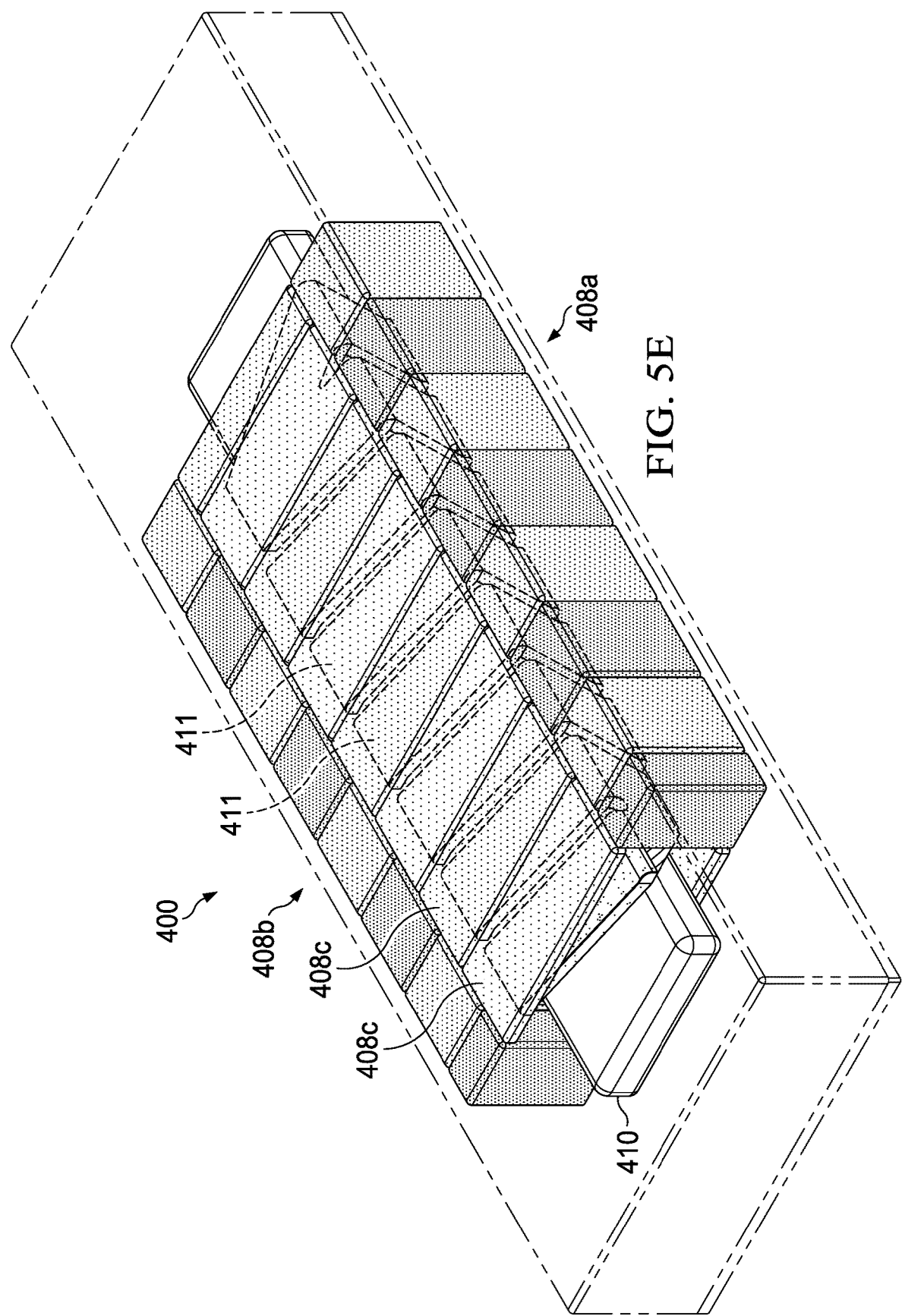

DOUBLE HELIX ACTUATOR WITH MAGNETIC SECTIONS HAVING ALTERNATING POLARITIES

TECHNICAL FIELD

This disclosure relates generally to electromechanical actuators for haptic engines and other applications.

BACKGROUND

Linear actuator architectures are often used in mobile devices to provide tap and haptic sensations. A traditional linear actuator architecture relies on moving alternating magnets with fixed racetrack coils, fixed alternating magnets with moving racetrack coils or moving inward facing magnets wrapped by a coil. With the traditional racetrack coil architecture, the force density at a fixed power consumption is limited to the cross-sectional area of the racetrack coils and the average intensity of the magnetic field incident normal to the direction of current in the racetrack coils. Only the portion of the racetrack coils where current flows orthogonal to the intended force direction contributes to force density.

SUMMARY

A double helix actuator is disclosed that includes a double helix coil wound around a movable proof mass that is enclosed within a magnetic structure. The double helix coil and the magnetic structure are arranged relative to each other so that the magnetic field generated by the entirety of the double helix coil contributes to a linear force direction of the actuator. The double helix actuator produces a greater linear force density compared to traditional racetrack coil actuators, where only a portion of the coil contributes to the linear force. The double helix actuator also produces torque in addition to linear force which allows the double helix to provide unique haptic sensations in a variety of applications.

In an embodiment, a double helix actuator comprises: a cover assembly having a top surface, two opposing sides and two opposing ends, the cover assembly including: a first set of magnets of alternating polarity arranged in a first row and attached to a first side of the cover assembly, a second set of magnets of alternating polarity arranged in a second row and attached to a second side of the cover assembly; a third set of magnets of alternating polarity arranged in a third row along the top surface of the cover assembly and disposed between the first and second sets of magnets, each magnet in the third set of magnets arranged to have a magnetic field direction that is orthogonal to magnetic field directions of the first and second sets of magnets; and a main assembly attached to the cover assembly, the main assembly including: an inner assembly including a moving mass and a coil helically-wound around the moving mass, such that the magnetic fields provided by the first, second and third sets of magnets follow a direction of the coil current; and a base assembly including a base and a fourth set of magnets of alternating polarity arranged in a fourth row on the base, the base attached to the cover assembly and forming a cavity for receiving the inner assembly, each magnet in the fourth set of magnets arranged to have a magnetic field direction that is in the same direction as the magnetic field direction of the third set of magnets.

In an embodiment, a cylindrical double helix actuator comprises: a cylindrical housing; flexure caps attached to opposite ends of the cylindrical housing forming a cavity, each flexure cap have a flexure; a helically magnetized core disposed within the cavity between the flexures of the flexure caps; and a flex coil helically-wound around the helically magnetized core in accordance with a winding pattern that is an alternating solenoid, with alternating dipole polarization and continuous helical polarization.

In an embodiment, an electronic device comprises: a haptic engine comprising: a cover assembly having a top surface, two opposing sides and two opposing ends, the cover assembly including: a first set of magnets of alternating polarity arranged in a first row and attached to a first side of the cover assembly, a second set of magnets of alternating polarity arranged in a second row and attached to a second side of the cover assembly; a third set of magnets of alternating polarity arranged in a third row along the top surface of the cover assembly and disposed between the first and second sets of magnets, each magnet in the third set of magnets arranged to have a magnetic field direction that is orthogonal to magnetic field directions of the first and second sets of magnets; and a main assembly attached to the cover assembly, the main assembly including: an inner assembly including a moving mass and a coil helically-wound around the moving mass, such that the magnetic fields provided by the first, second and third sets of magnets follow a direction of the coil current; and a base assembly including a base and a fourth set of magnets of alternating polarity arranged in a fourth row on the base, the base attached to the cover assembly and forming a cavity for receiving the inner assembly, each magnet in the fourth set of magnets arranged to have a magnetic field direction that is in the same direction as the magnetic field direction of the third set of magnets; a controller coupled to the haptic engine, the controller generating and sending a drive signal to the haptic engine to drive the haptic engine into motion, the drive signal being adjusted by the controller based on one or more feedback signals from the haptic engine that are generated in response to the motion, the frequency and duration of the drive signal determined by a request to generate a haptic sensation; one or more processors; memory storing instructions that when executed by the one or more processors, cause the one or more processors to perform one or more operations comprising: sending, to the controller, the request to generate the haptic sensation.

Particular embodiments disclosed herein provided one or more of the following advantages. The double helix actuator architecture enables volume reduction of a linear actuator while maintaining critical performance parameters. The architecture allows more space for a bigger battery. The single stage design enables simple scaling to a larger force actuator. The architecture enables haptics for high-mass products that require far more force than traditional haptic engines. The torque produced along with the linear force enables a unique haptic response. The magnet and coil geometry result in a greater force density within a fixed enclosure volume than conventional racetrack coil architectures. The magnet and coil geometry result in a greater motor efficiency within a fixed enclosure volume than conventional racetrack coil architectures. The output of the double helix actuator architecture contains multiple degrees of freedom, making the double helix architecture suitable for integration into a variety of systems with different form factor and power constraints.

The details of the disclosed implementations are set forth in the drawings and the description below. Other features, objects and advantages are apparent from the description, drawings and claims.

DESCRIPTION OF DRAWINGS

FIG. 1C is a side view of the traditional racetrack coil actuator.

FIG. 5A is a side view of the double helix actuator illustrating magnet orientation, according to an embodiment.

FIG. 5C is an end view of the double helix actuator illustrating magnet orientation, according to an embodiment.

FIG. 5D is a blow-up view of an inner assembly of the double helix actuator illustrating a coil winding pattern, according to an embodiment.

FIG. 5E is an alternative perspective view of the double helix actuator illustrating magnet orientation, according to an embodiment.

The same reference symbol used in various drawings indicates like elements.

DETAILED DESCRIPTION

Example Racetrack Coil Architecture

Figure 1A:
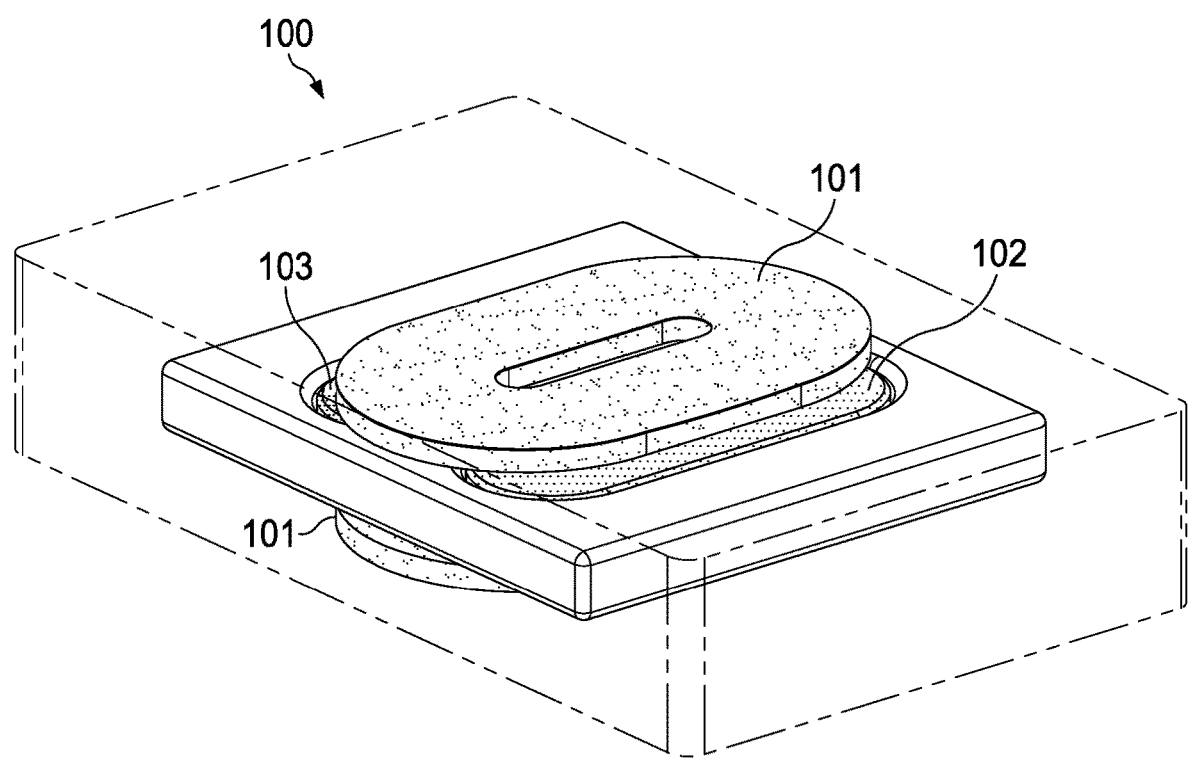
FIG. 1A is a perspective view of a traditional racetrack coil actuator that produces force in a portion of the coil.
Figure 1B:
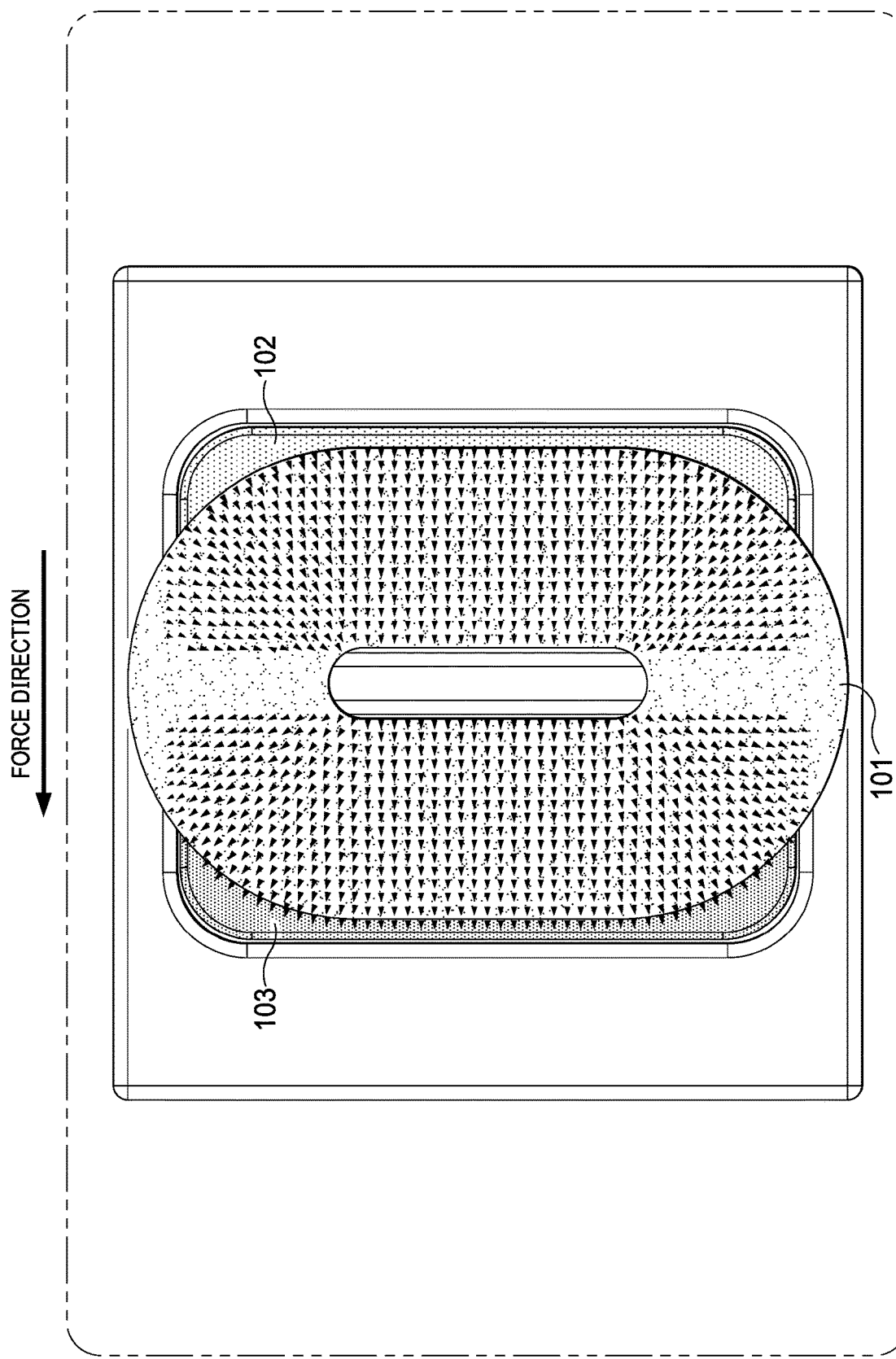
FIG. 1B is a top view of the traditional racetrack coil actuator.

FIG. 1A is a perspective view of a traditional racetrack coil actuator 100 that produces force (Lorentz force) in a portion of the coil. Actuator 100 includes coil 101, North magnet 102 and South magnet 103. FIG. 1B is a top view of architecture 100 showing the force direction. FIG. 1C is a side view of architecture 100. In general, the force density of an electromagnetic motor at fixed power consumption is limited by the total cross-sectional area of the motor coils and the average intensity of the magnetic field incident normal to the direction of current in the coils. Note that the direction of the force arrows shown in FIGS. 1B and 1C indicate the direction of the force contribution. In actuator 100, only the portions of coil 101 where the current flows orthogonal to the intended force direction contribute to the linear force. The other portions of coil 101 do not contribute to the linear force.

Example Double Helix Actuators

Figure 2A:
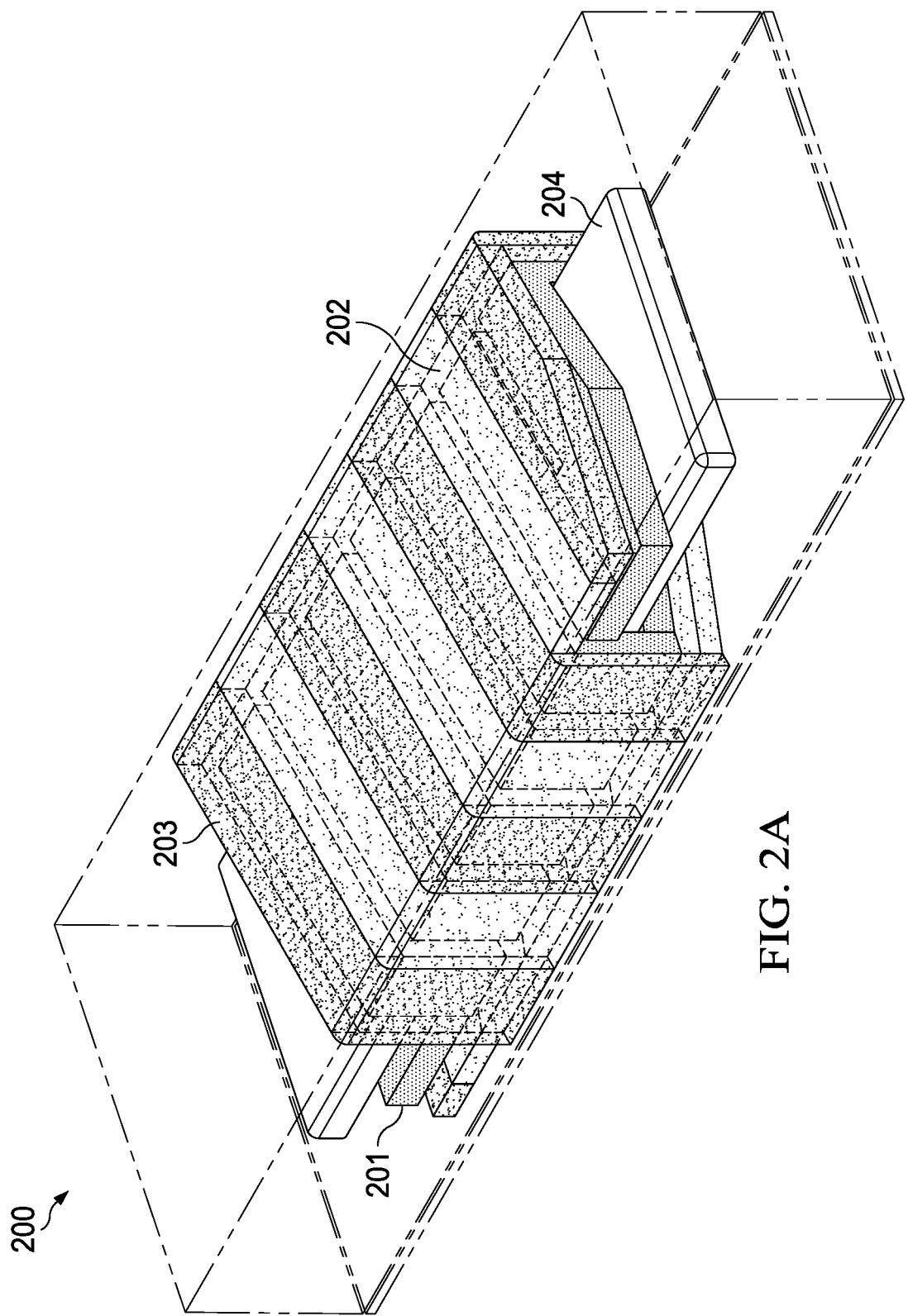
FIG. 2A is a perspective view of a rectangular, double helix actuator that produces force throughout the entirety of the coil, according to an embodiment.
Figure 2B:
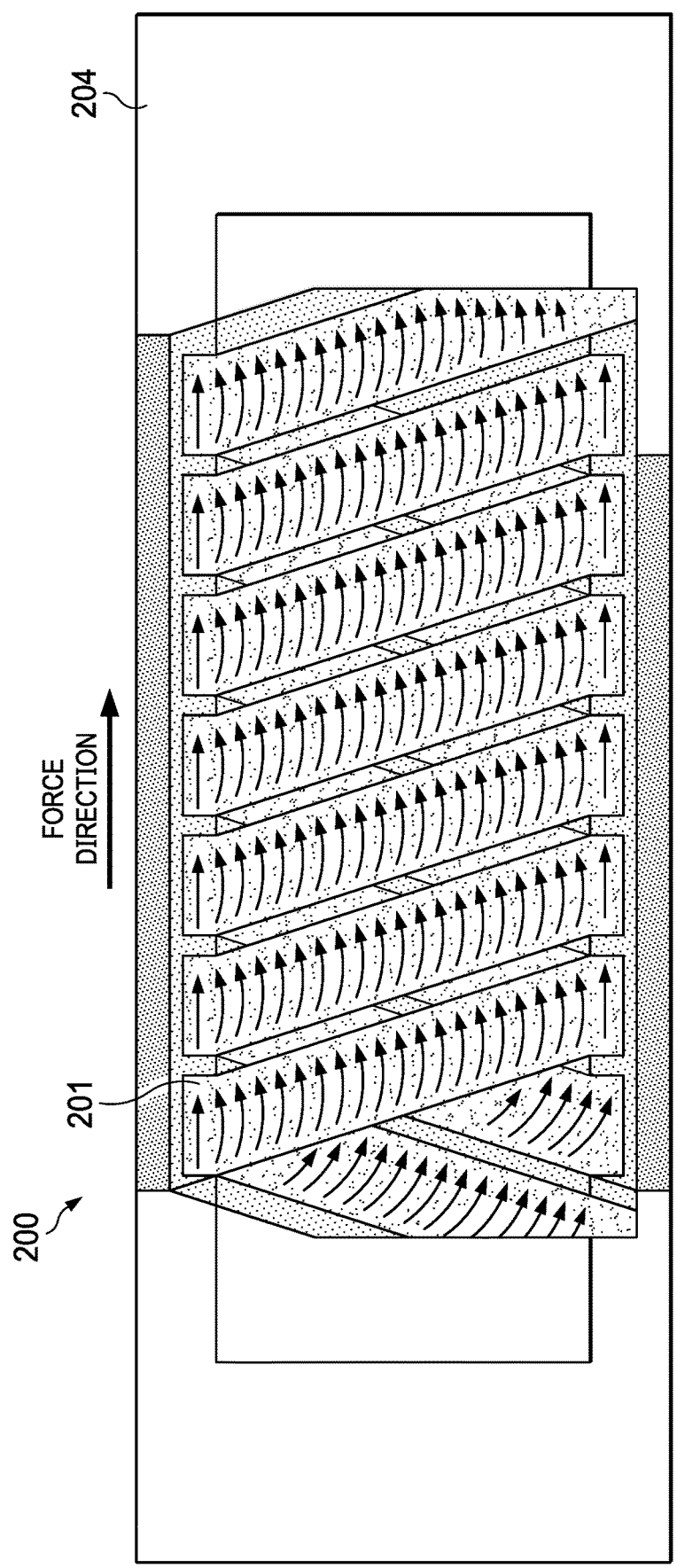
FIG. 2B is a top view of the rectangular, double helix actuator showing the force direction, according to an embodiment.
Figure 2C:
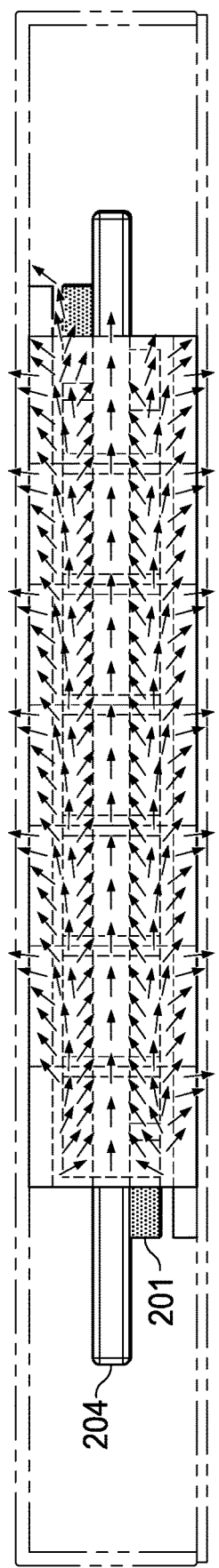
FIG. 2C is a side view of the rectangular, double helix actuator, according to an embodiment.

FIG. 2A is a perspective view of a rectangular, double helix actuator 200. Actuator 200 includes helix coil 201, magnetic sections 202 polarized inward and magnetic sections 103 polarized outward. FIG. 2B is a top view of actuator 200 showing the force direction. FIG. 2C is a side view of actuator 200.

As indicated by the direction of the force arrows, actuator 200 produces force in the force direction throughout the entirety of coil 201. Accordingly, actuator 200 produces a greater linear force density compared to actuator 100. Actuator 200 also produces torque in addition to linear force which presents an opportunity for unique haptic sensation in products, such as writing implements. Note that a single layer winding of the helical path contains not only a transverse field, but also an axial field component. The axial field is canceled by adding a second layer which has the opposite winding angle and an appropriate current direction so that the transverse fields of both layers add and the axial fields cancel.

Figure 3A:
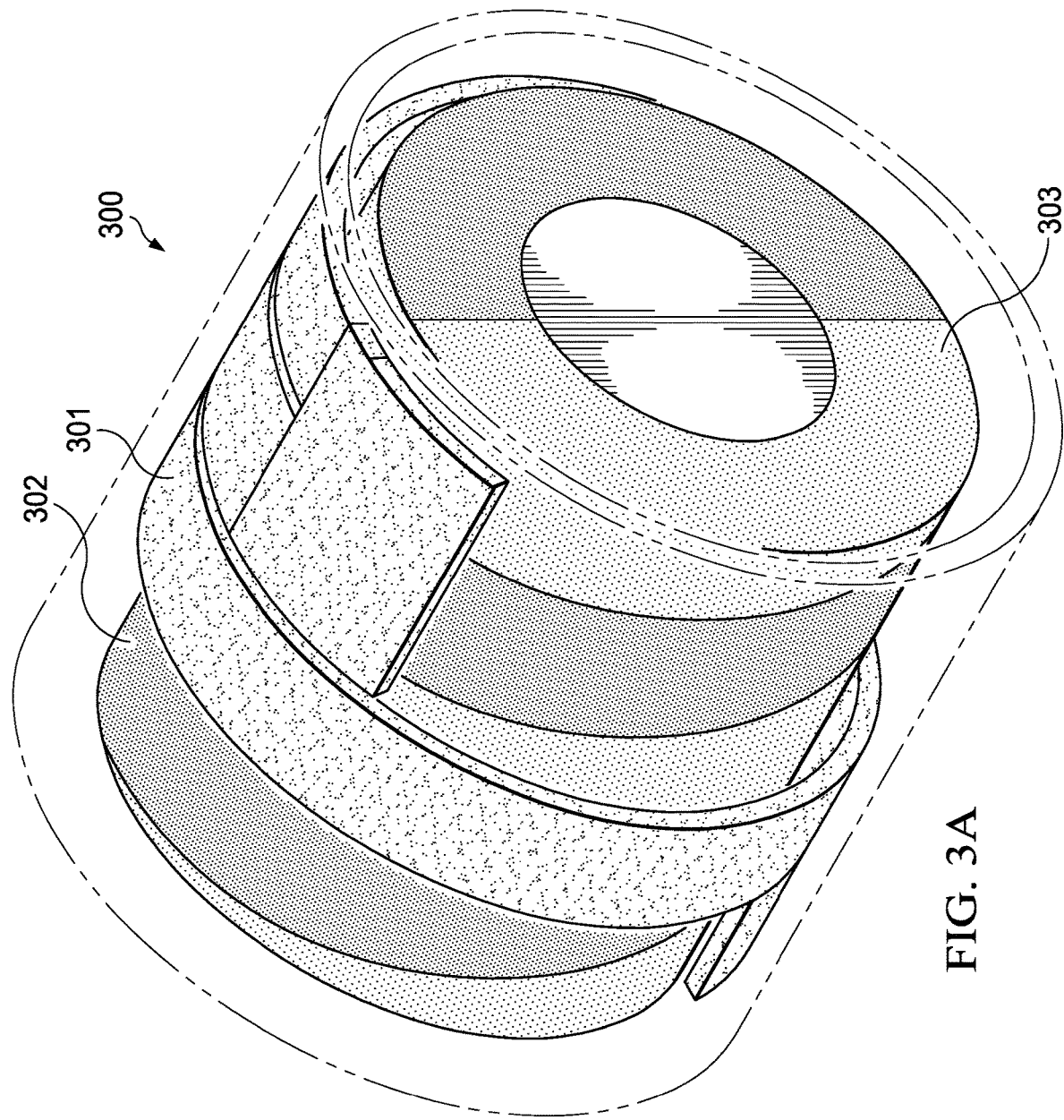
FIG. 3A is a perspective view of a cylindrical, double helix actuator, according to an embodiment.
Figure 3B:
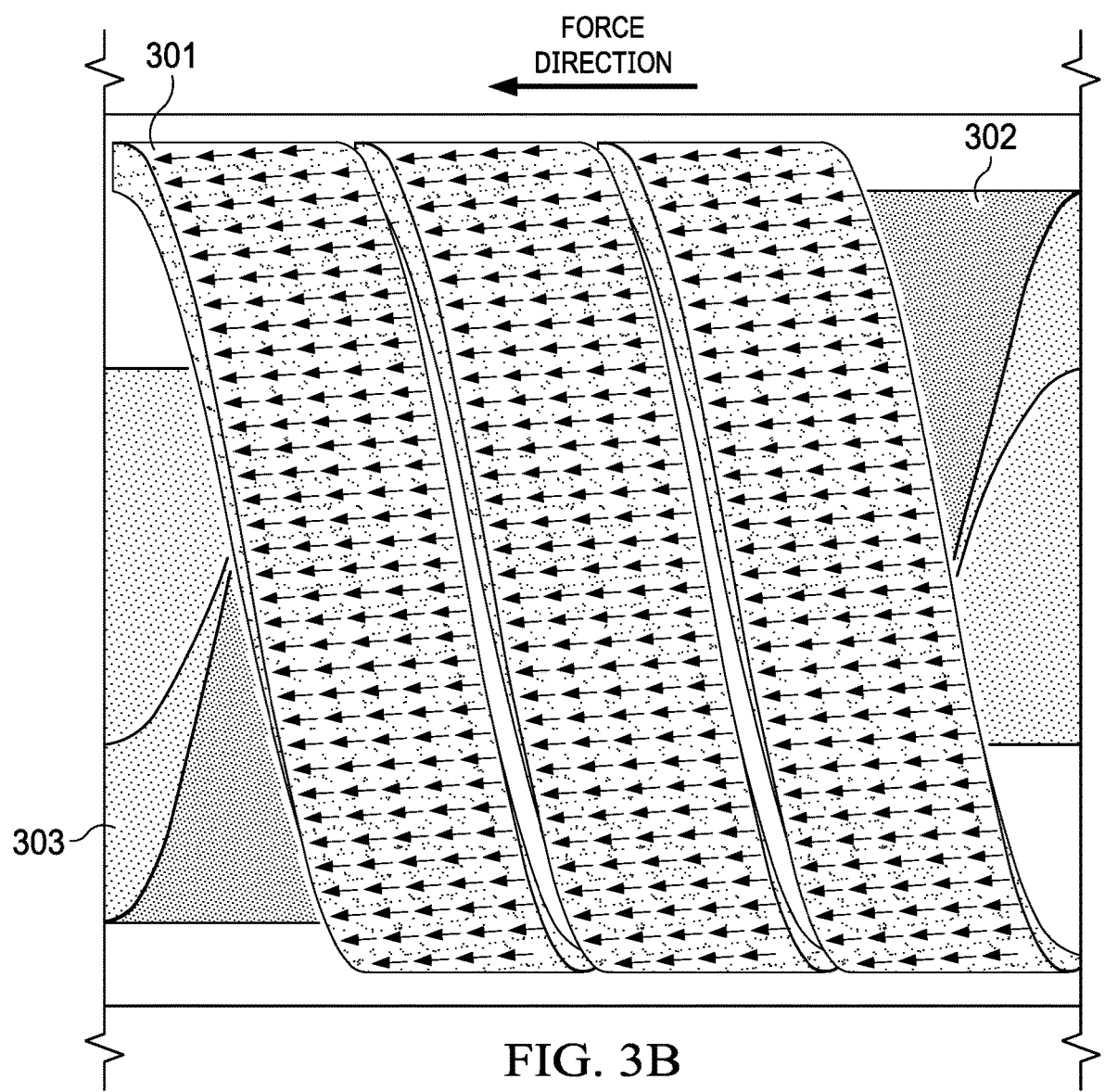
FIG. 3B is a side view of the cylindrical, double helix actuator showing the force direction, according to an embodiment.

FIG. 3A is a perspective view of a cylindrical, double helix actuator 300, according to an embodiment. Actuator 300 includes helix coil 301, magnetic sections 302 polarized inward and magnetic sections 303 polarized outward. FIG. 3B is a top view of actuator 300 showing the force direction. Note that the directions of the force arrows shown in FIG. 3B indicate the directions of the force contributions. As indicated by the directions of the force arrows, actuator 300 produces force in the force direction throughout the entirety of coil 301.

Figure 4A:
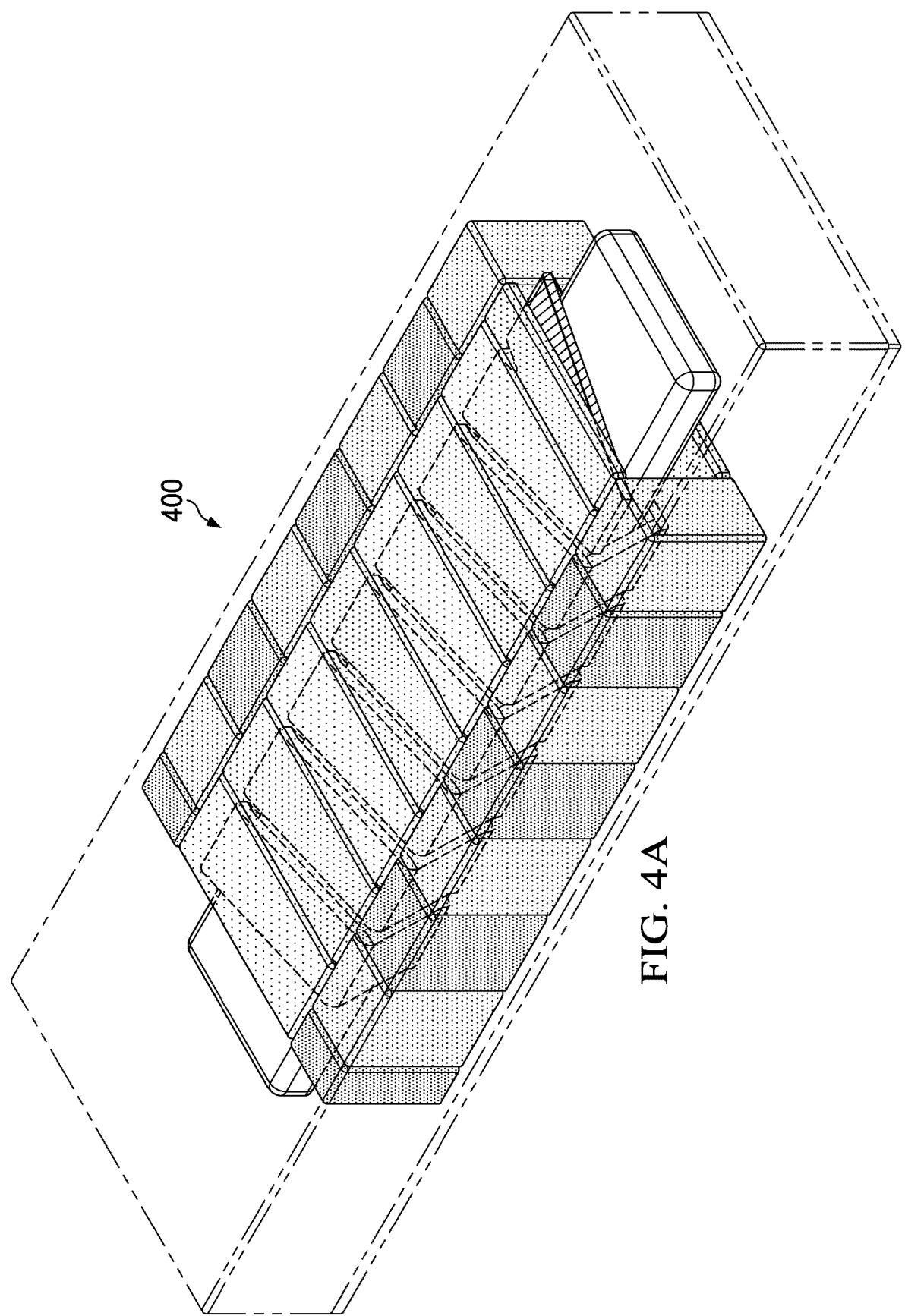
FIG. 4A is a perspective view of an assembled double helix actuator, according to an embodiment.
Figure 4B:
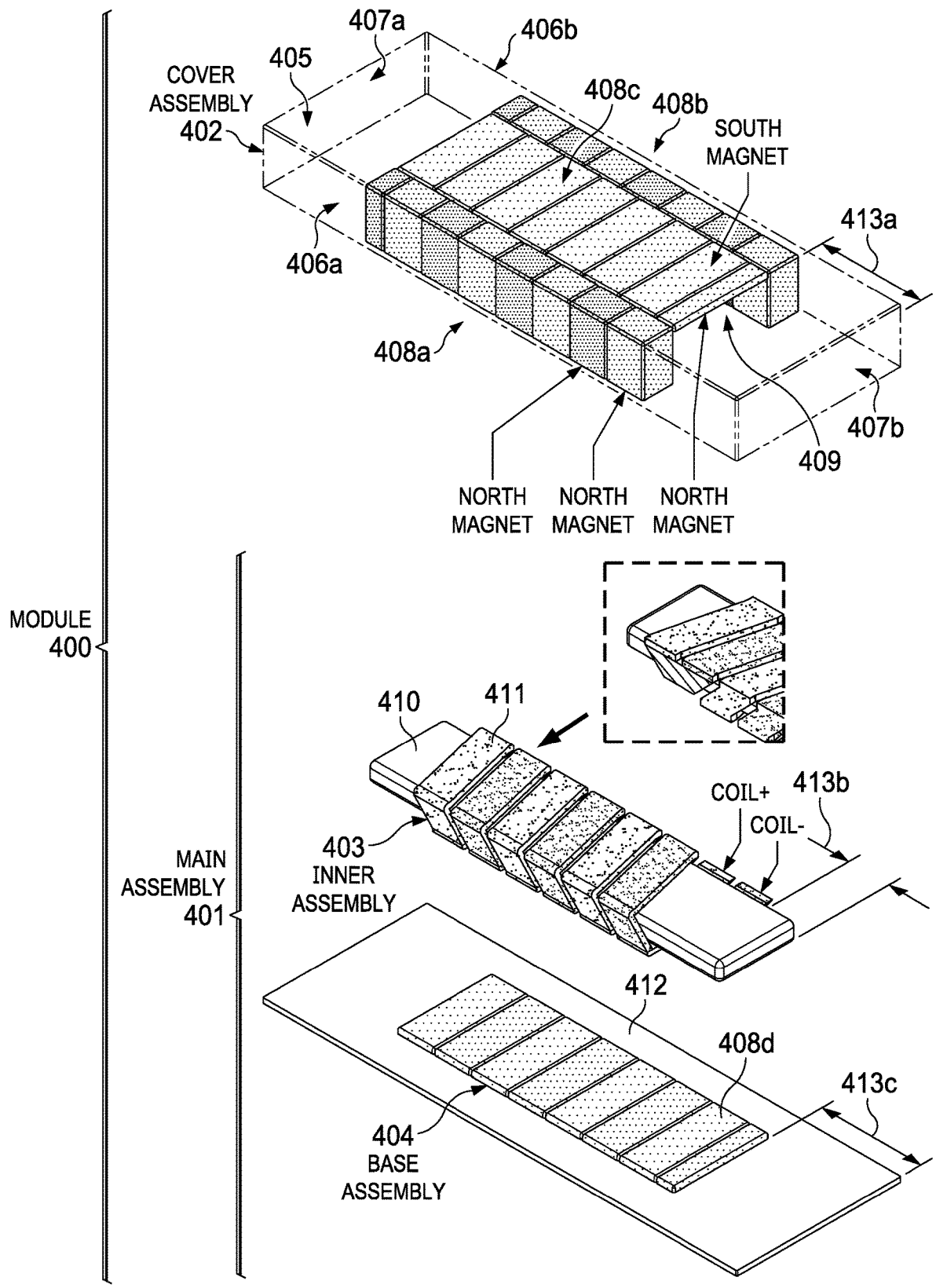
FIG. 4B illustrates the various components of the assembly shown in FIG. 4A, according to an embodiment.

FIG. 4A is a perspective view of an assembly of double helix actuator module 400, according to an embodiment. FIG. 4B illustrates the components of module 400 shown in FIG. 4A. Module 400 includes main assembly 401, cover assembly 402, inner assembly 403 and base assembly 404.

Cover assembly 402 is a rectangular-shaped magnetic structure that includes top surface 405, sides 406a, 406b, and ends 407a, 407b. Magnetic sections 408a (West and East magnets) of alternating polarity are arranged in a row and attached to side 406a of cover assembly 402. Magnetic sections 408b (also West and East magnets) of alternating polarity are arranged in a second row and attached to side 406b of cover assembly 402. As shown in FIG. 4B, magnetic sections 408a and magnetic sections 408b are arranged such that magnets having the same polarity are opposite each other. For example, West magnets of magnetic sections 408a oppose West magnets of magnetic sections 408b, and East magnets of magnetic sections 408a oppose East magnets of magnetic sections 408b.

Magnetic sections 408c (South and North magnets) of alternating polarity are arranged in a row and attached to top surface 405 of cover assembly 402. Magnetic sections 408c are disposed between magnetic sections 408a, 408b, such that their magnetic field directions are orthogonal to magnetic field directions generated by magnetic sections 408a, 408b. That is, the magnetic structure is designed to generate magnetic fields in West, East, North, and South directions. Magnetic sections 408a-408c are also arranged relative to each other such that when base assembly 404 is attached to cover assembly 402, cavity 409 is formed. Cavity 409 encloses inner assembly 403, which is disposed between mechanical linkages (not shown) attached to the cover assembly 402 (e.g., flexures, springs).

Main assembly 401 is configured to attach to cover assembly 402. Main assembly 401 includes inner assembly 403 and base assembly 404. Inner assembly 403 includes proof mass 410 and double helix coil 411 wound in two layers around proof mass 410. As shown in the close-up view, the direction of coil 411 reverses at its end. When main assembly 401 is attached to cover assembly 402 and base assembly 404, inner assembly 403 is disposed within cavity 409, such that inner assembly 403 can move within cavity 409 in the force direction of actuator 400.

Base assembly 404 includes base 412 and magnetic sections 408d of alternating polarity. Magnetic sections 408d are arranged in a row and attached to base 412 such that they are directly opposite to magnetic sections 408c of the same polarity when main assembly 401 is attached to cover assembly 402. Spaces 413a-413c are reserved in module 400 for crash stops, to allow proof mass travel and for introducing displacement using flexures or springs.

In double helix actuator 400 described above, double helix coil 411 is wound in two layers around proof mass 410, such that for each winding the magnetic field direction and coil current direction follow each other. In contrast to the traditional racetrack coil actuator, the double helix actuator 400 produces a linear force throughout the entirety of coil 411. Also, the magnet and coil geometry of double helix actuator 400 results in a greater force density and motor efficiency within a fixed enclosure volume than the traditional racetrack coil architectures. Finally, the output of double helix actuator 400 contains multiple degrees of freedom, allowing double helix actuator 400 to be used in a variety of applications that are constrained in form factor and power, such as smartphones, smart watches, tablet computers, notebook computers, electronic pens/pencils and rotation piston applications (e.g., a dental drill, boring machines, etc.).

As used herein, the terms "coil" and "helix" include but are not limited to regular geometric patterns. In addition, the terms "coil" and "helix" include configurations wherein a width (e.g., along the axial direction) or a thickness (e.g., along a radial direction or transverse to the axial direction) may vary. Reference to a type of shape (e.g., rectangular, cylindrical) is not limited to a symmetrical or regular shape. Contemplated embodiments include variations which depart substantially from regular geometries.

With coils helically-wound about an axis to produce magnetic field components transverse to the axis, cancellation of axial field components can be effected by the formation of coils in concentrically positioned pairs having opposite winding angles, this sometimes resulting in a high quality transverse field. Generally, however, in embodiments having multiple pairs of coils with each coil helically-wound about an axis to produce transverse and axial magnetic field components, it is not necessary that members of pairs having opposite winding angles, to control or eliminate transverse axial components with respect to one another, be immediately next to one another in the sequence of coil rows.

FIG. 5A is a side view of double helix actuator 400 shown in FIGS. 4A and 4B illustrating magnet orientation, according to an embodiment. Shown in FIG. 5A is a magnetic field pattern, coil current pattern and force pattern. As can be observed, the magnetic field orientation (shown by the direction of the arrows) and coil current follow each other, and the entire coil 411 contributes to the linear force.

Figure 5B:
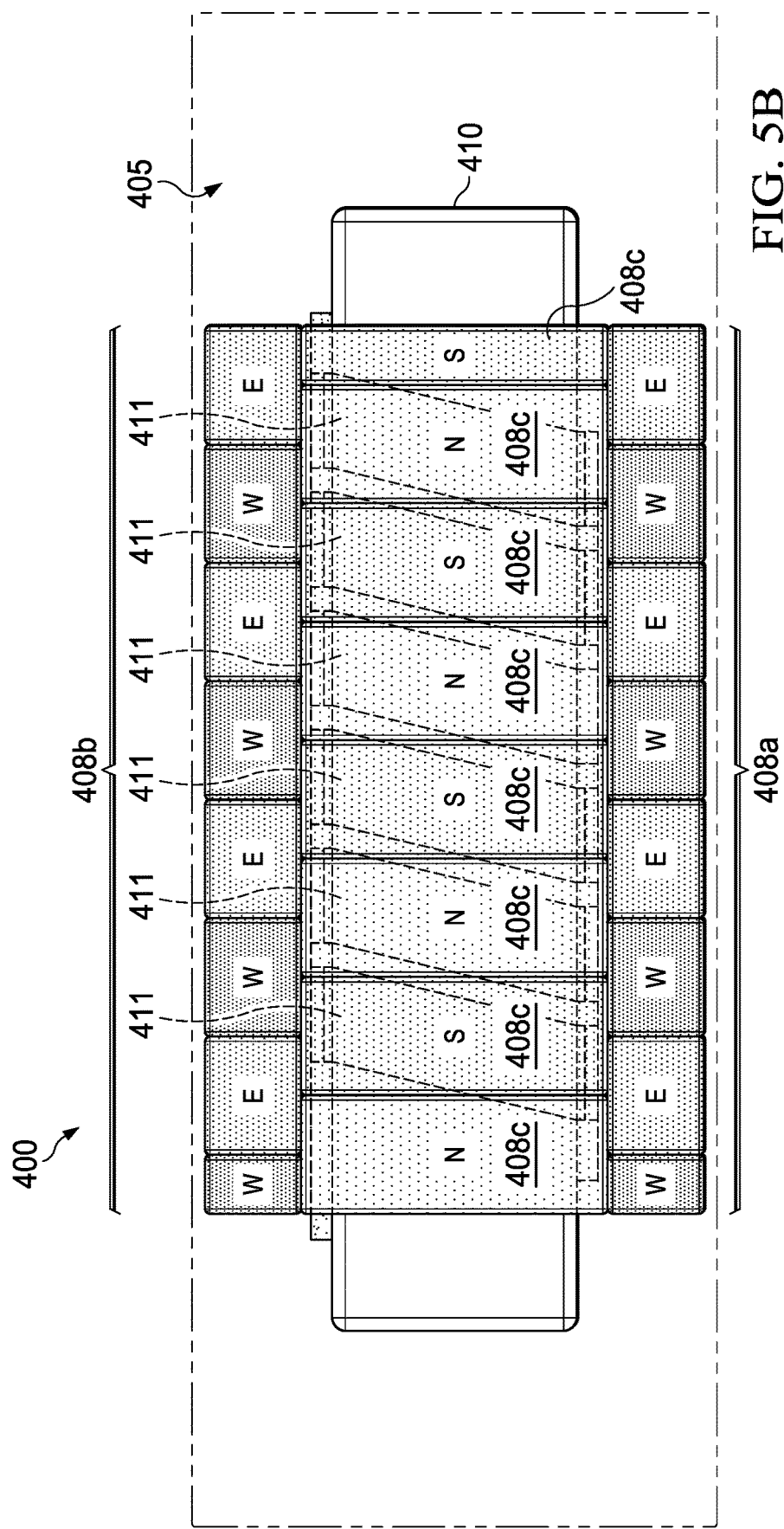
FIG. 5B is a bottom view of the double helix actuator illustrating magnet orientation, according to an embodiment.

FIG. 5B is a bottom view of double helix actuator 400 illustrating magnetic field orientation due to magnetic sections 408d, according to an embodiment.

FIG. 5C is an end view of double helix actuator 400 illustrating magnetic field orientation due to magnetic sections 408c, according to an embodiment.

FIG. 5D is a blow-up view of inner assembly 403 of double helix actuator 400 illustrating a winding pattern for coil 411, according to an embodiment. Note that coil 411 includes a first helix layer 411a that starts from end 415a of proof mass 410 and winds around the length of proof mass 410 in a helix pattern (similar to a barber shop pole) until end 415b is reached. At end 415b, coil 411 winds around the length of proof mass 410 in the opposite direction to create second helix layer 411b that is disposed between gaps left by first helix layer 411a.

FIG. 5E is another perspective view of double helix actuator 400 illustrating magnetic field orientation, according to an embodiment.

Figure 6A:
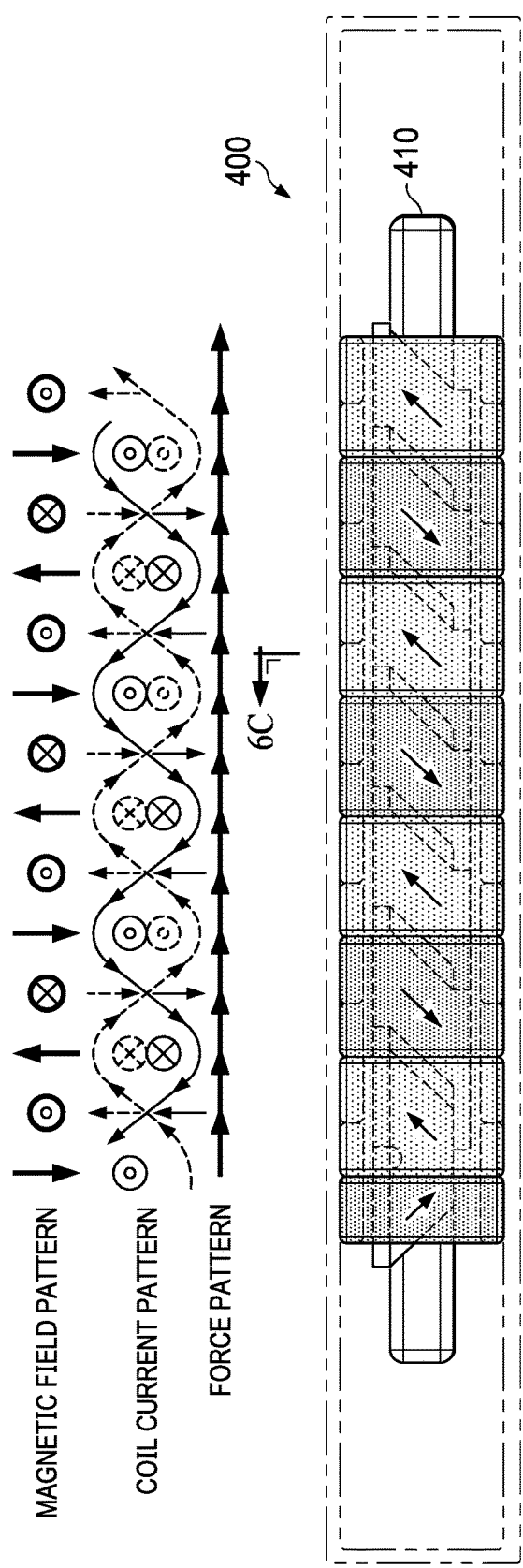
FIG. 6A is a side view of the double helix actuator illustrating current orientation, according to an embodiment.
Figure 6C:
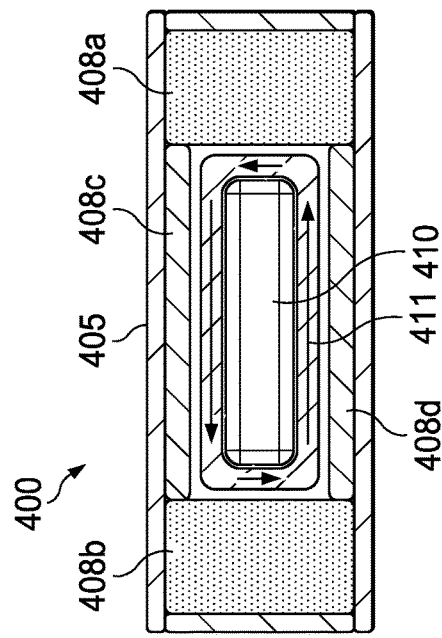
FIG. 6C is an end view of the double helix actuator illustrating current orientation, according to an embodiment.
Figure 6B:
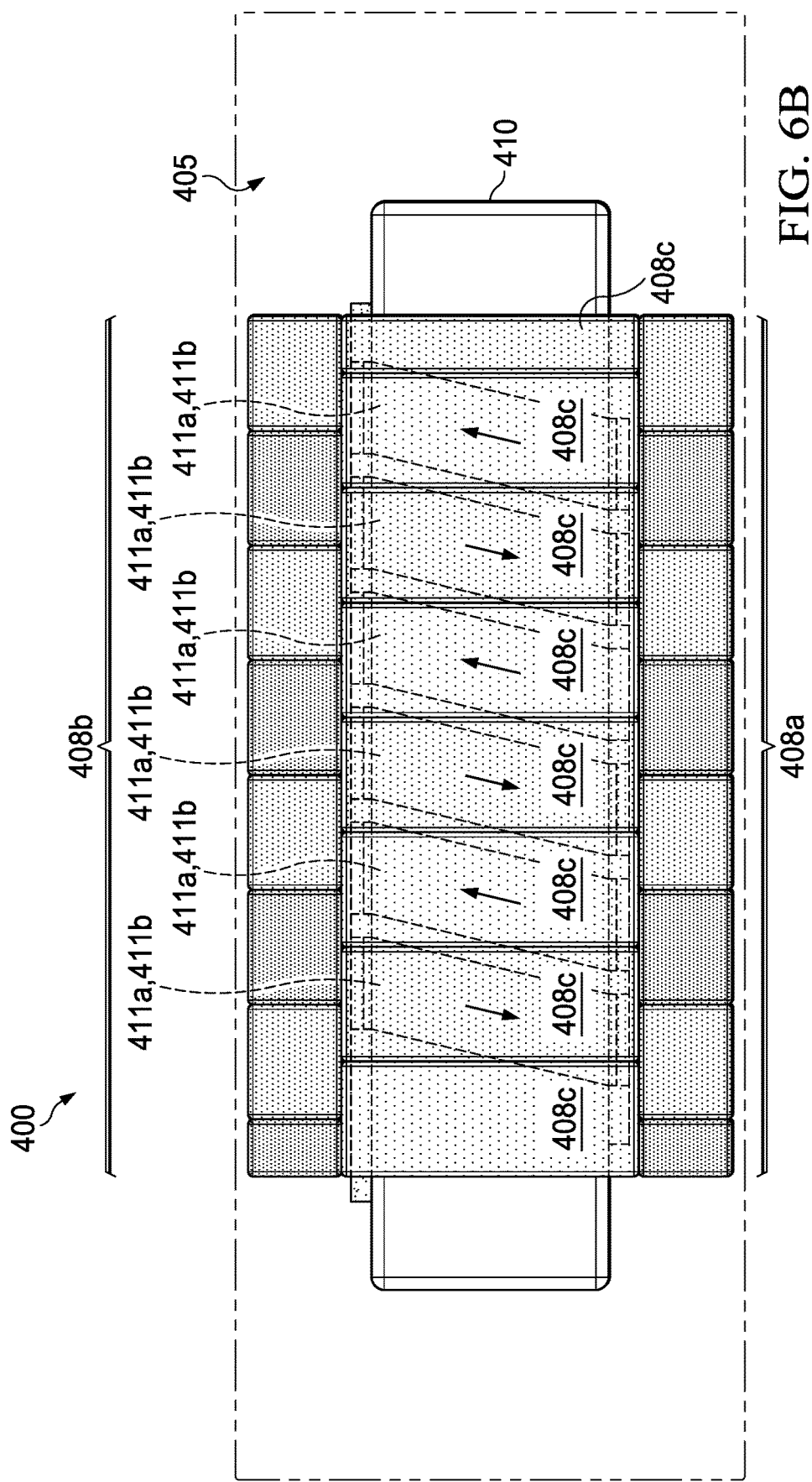
FIG. 6B is a bottom view of the double helix actuator illustrating current orientation, according to an embodiment.

FIG. 6A is a side view of double helix actuator 400 illustrating current orientation, according to an embodiment.
FIG. 6B is a bottom view of double helix actuator 400 illustrating current orientation, according to an embodiment.
FIG. 6C is an end view of double helix actuator 400 illustrating current orientation, according to an embodiment.

Figure 7A:
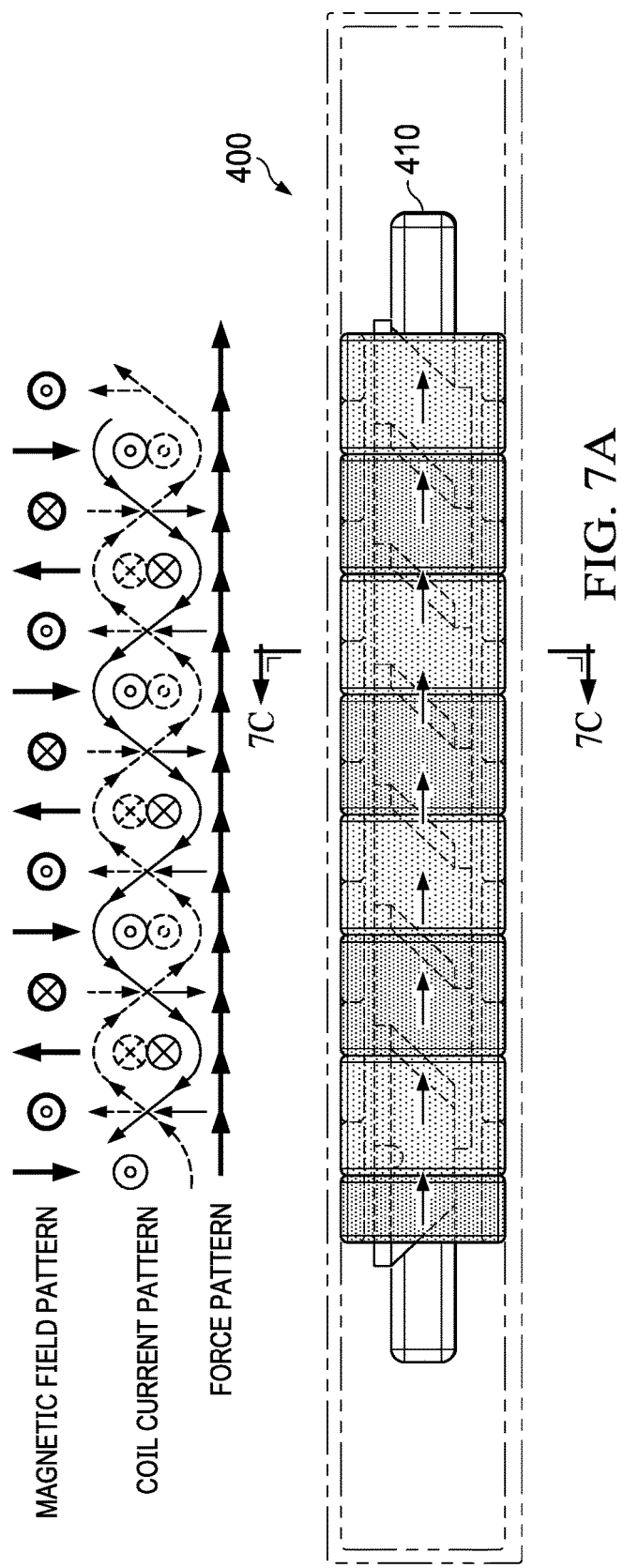
FIG. 7A is a side view of the double helix actuator illustrating coil force, according to an embodiment.
Figure 7C:
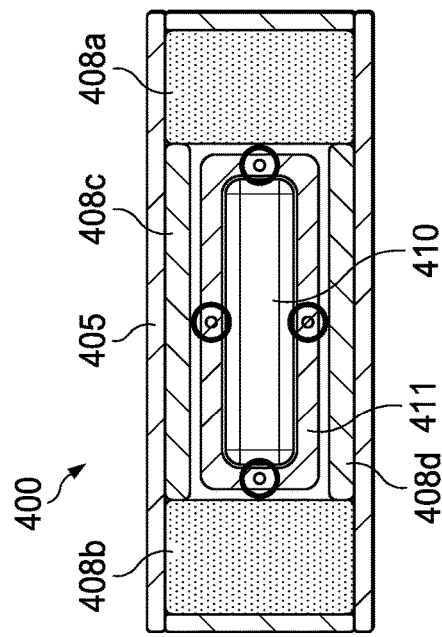
FIG. 7C is an end view of the double helix actuator illustrating coil force, according to an embodiment.
Figure 7B:
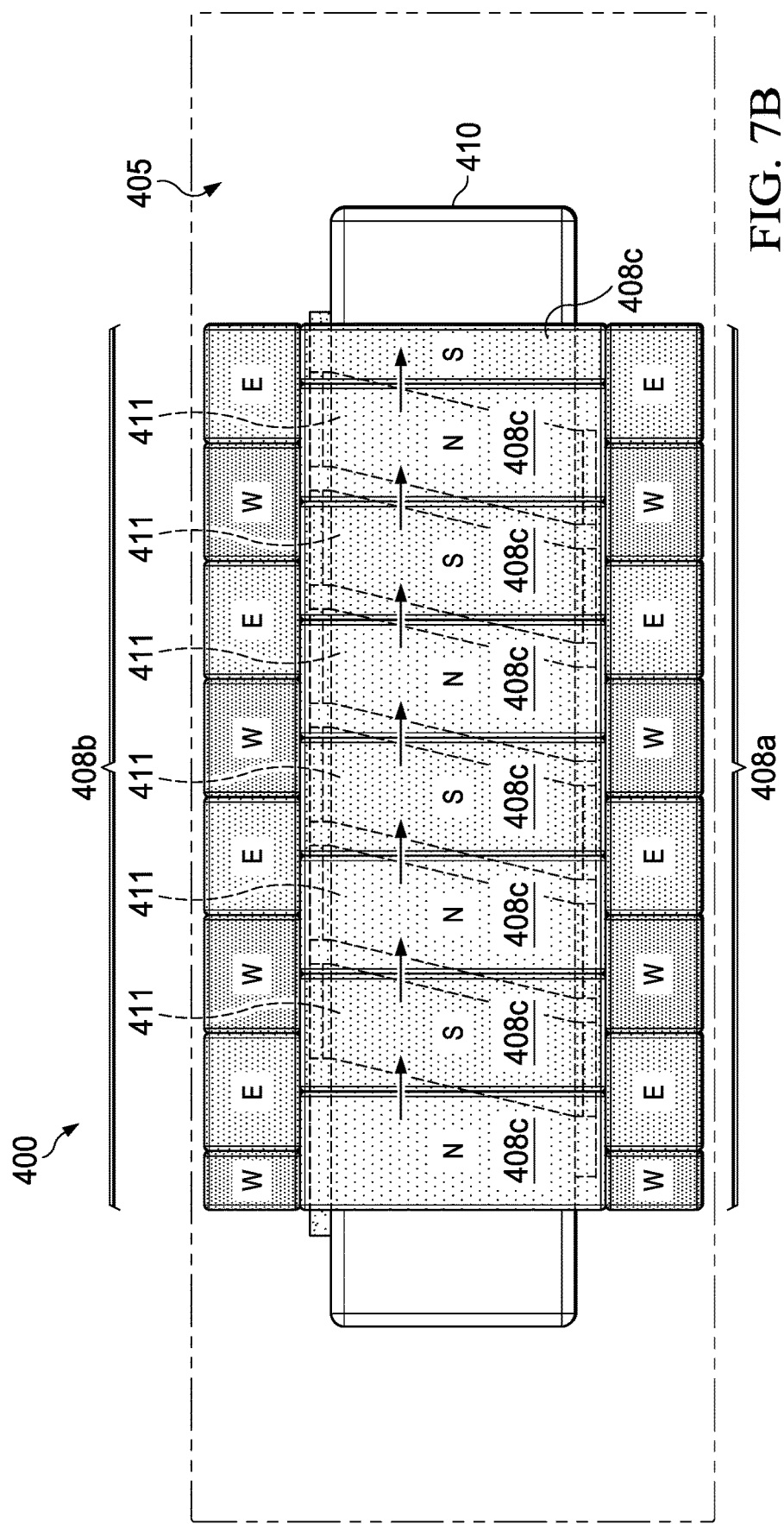
FIG. 7B is a bottom view of the double helix actuator illustrating coil force, according to an embodiment.

FIG. 7A is a side view of double helix actuator 400 illustrating coil force, according to an embodiment. FIG. 7B is a bottom view of double helix actuator 400 illustrating coil force, according to an embodiment. FIG. 7C is an end view of double helix actuator 400 illustrating coil force, according to an embodiment.

Figure 8:
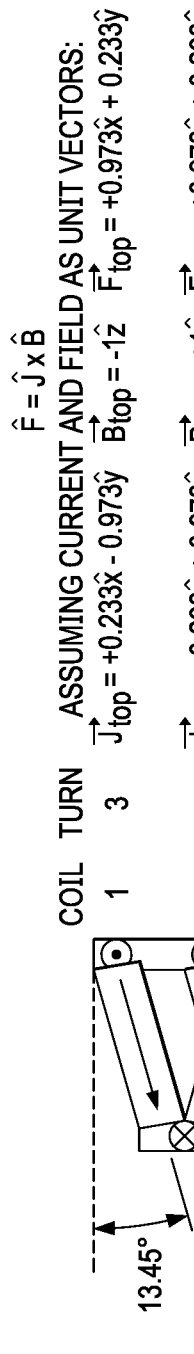
FIG. 8 illustrates force and torque production due to a helical winding angle, according to an embodiment.
Figure 8:
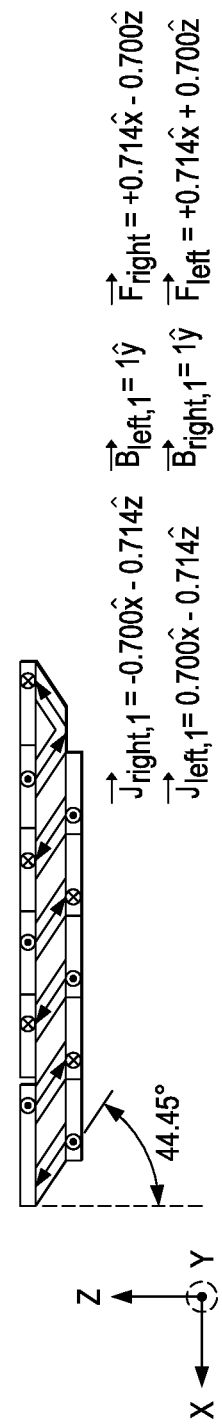

FIG. 8 illustrates force and torque production due to a helical winding angle, according to an embodiment. The force density $\vec{F}$ is given by:

$$\vec{F} = \vec{J} \times \vec{B}, \qquad [1]$$

where $\vec{J} = I\vec{A}$, I is the total current through the cross-section of the coil, $\vec{A}$ is the cross-sectional area of the coil, and $\vec{B}$ is the magnetic field vector. The direction of $\vec{A}$ is perpendicular to the cross-section in the direction given by the loop right-hand-rule. In the example shown, $\vec{J}$ and $\vec{B}$ are assumed to be unit vectors, the winding angles are 13.45° in the x-y plane and 44.45° in the x-z plane, respectively. Vector values are shown for current, magnetic field and torque for turns 1-3 for coil layer 1 and turns 1-3 for coil layer 2. As can be observed from FIG. 8, opposite z-oriented forces are produced on the left (−y) and right (+y) sides of the coil windings in addition to the x-oriented linear force, producing a torque. The torque can enable a unique haptic response for certain applications, such as a digital writing implements.

Example Control Systems for Double Helix Actuators

Figure 9:
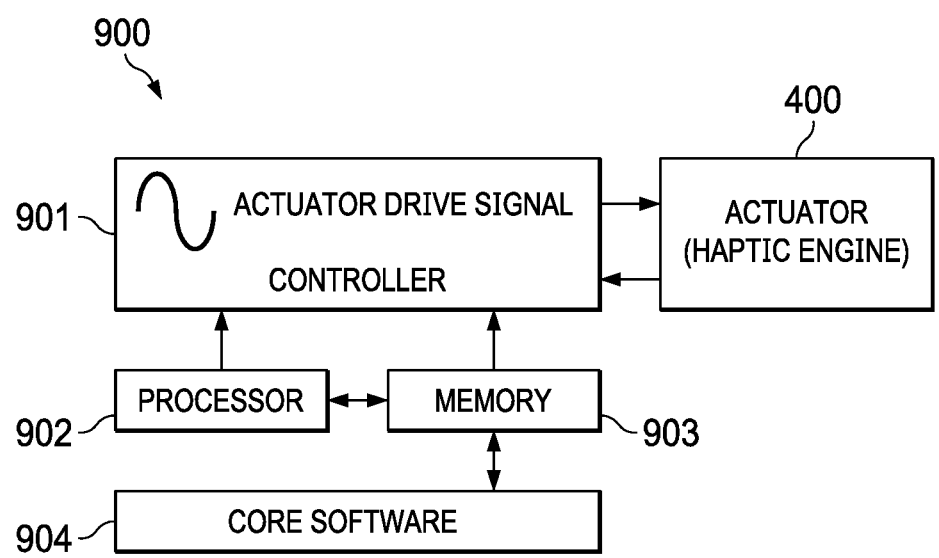
FIG. 9 is a block diagram of a control system for controlling the double helix actuator shown in FIGS. 1-8, according to an embodiment.

FIG. 9 is a block diagram of an open loop control system 900 for the double helix actuator 400 shown in FIGS. 1-8, according to an embodiment. Control system 900 includes controller 901, processor 902 and memory 903. Controller can be configured to provide an actuator drive signal to control the motion of double helix actuator 400 (e.g., a haptic engine). Memory 903 includes core software instructions 904 executed by controller 901 and processor 902 to implement control of actuator 400. Actuator 400 can be a moving coil type actuator or a moving magnet type actuator.

In a first embodiment of control system 900, memory 903 includes core software instructions 904 to implement open loop control of actuator 400. In a second embodiment of control system 900, memory 903 includes core software instructions to implement velocity sensing, closed-loop control of actuator 400. In the second embodiment, controller 901 receives back-electromotive force (EMF) voltage measurements at the coil terminals to be used by a closed-loop control law to generate and send control commands to double helix actuator 400. In a third embodiment of control system 900, memory 903 includes core software instructions 904 to implement position sensing closed-loop control of actuator 400. In the third embodiment, controller 901 receives position data from one or more magnetic sensors (e.g., one or more Hall sensors), or a position indicating magnet located on the proof mass. If the actuator is a moving magnet type of actuator, then the magnetic sensors can be attached to the housing to measure the position of the drive magnets. In a fourth embodiment of control system 900, memory 903 includes core software instructions to implement position and velocity sensing closed-loop control of actuator 400. In this fourth embodiment, controller 901 receives back-EMF voltage measurements at the coil terminals and position data from one more magnetic sensors (e.g., Hall sensors) to be used by a closed-loop control law to generate and send control commands to double helix actuator 400.

In an embodiment, an example closed-loop control system 900 suitable for controlling a double helix actuator in a haptic engine using back-EMF and Hall sensors is described in co-pending U.S. patent application Ser. No. 15/698,559 for "Closed-Loop Control of Linear Resonant Actuator Using Back-EMF data and Hall Sensing," filed Sep. 7, 2017, which patent application is incorporated by reference herein in its entirety.

Example Cylindrical Double Helix Actuator

Figure 10:
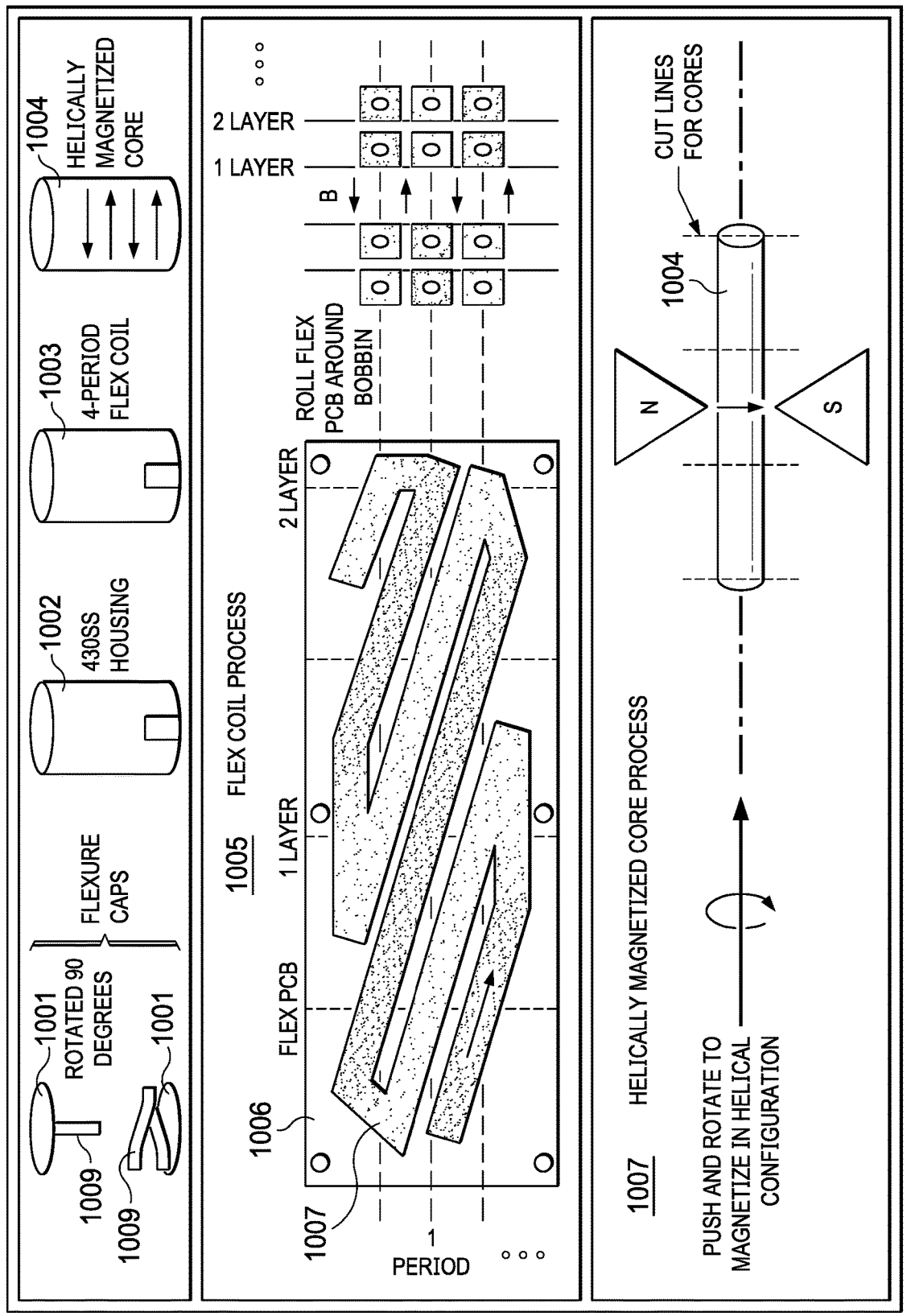
FIG. 10 illustrates a cylindrical double helix actuator with flex coil, according to an embodiment.

FIG. 10 illustrates a cylindrical double helix actuator with flex coil, according to an embodiment. The actuator can be assembled from 4 components: flexure caps 1001, cylindrical housing 1002, flex coil 1003 and helically magnetized core 1004. FIG. 3A shows an assembled cylindrical double helix actuator. In the embodiment shown, flex coil process 1005 includes disposing a 4-period winding pattern 1007 on a rolled flex printed circuit board (PCB) to create flex coil 1003. Winding pattern 1007 is an alternating solenoid, with alternating dipole polarization and continuous helical polarization. Winding pattern 1007 reverses direction every other period to eliminate torque and has a varying period length to linearize force.

Magnet design process 1008 includes progressively magnetizing AlNiCo cylindrical core 1004 in a helical configuration and reversing the helical direction every other period to eliminate torque. In an embodiment, flexures 1009 are attached to flexure caps 1001, and flexure caps 1001 are rotated 90 degrees relative to each other. Flexure caps 1001 are connected to AlNiCo core 1004 by braizing. Alternately, spiral springs can be used instead of flexures 1009. In an embodiment, the helical direction can be reversed so that the spring compression torque is opposite of the magnetic torque. In an embodiment, the helical direction can be followed so that spring compression torque is the same as the magnetic torque.

While this document contains many specific implementation details, these details should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination. Logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A double helix actuator, comprising:
 a cover assembly having a top surface, two opposing sides and two opposing ends, the cover assembly including:
  a first set of magnetic sections of alternating polarity arranged in a first row and attached to a first side of the cover assembly, a second set of magnetic sections of alternating polarity arranged in a second row and attached to a second side of the cover assembly; a third set of magnetic sections of alternating polarity arranged in a third row along the top surface of the cover assembly and disposed between the first and second sets of magnetic sections, each magnetic section in the third set of magnetic sections arranged to have a magnetic field direction that is orthogonal to magnetic field directions of the first and second sets of magnetic sections; and
 a main assembly attached to the cover assembly, the main assembly including:
  an inner assembly including a proof mass and a coil helically-wound around the proof mass, such that the magnetic fields provided by the first, second and third sets of magnetic sections follow a direction of a coil current; and
  a base assembly including a base and a fourth set of magnetic sections of alternating polarity arranged in a fourth row on the base, the base attached to the cover assembly and forming a cavity for receiving the inner assembly, each magnetic section in the fourth set of magnetic sections arranged to have a magnetic field direction that is in the same direction as the magnetic field direction of the third set of magnetic sections.

2. The double helix actuator of claim 1, wherein the coil is helically-wound in two layers around the proof mass, such that for each winding of the coil the magnetic field direction and the coil current direction follow each other.

3. The double helix actuator of claim 1, wherein one or more spaces are reserved in the double helix actuator for one or more crash stops, to allow proof mass travel or to introduce displacement using at least one of flexures or springs.

4. The double helix actuator of claim 1, wherein the first set of magnetic sections are polarized inward toward the coil and the second set of magnetic sections are polarized outward away from the coil.

5. The double helix actuator of claim 1, wherein the third set of magnetic sections are arranged to be opposite fourth magnetic sections of the same polarity.

6. The double helix actuator of claim 1, further comprising:
   a controller coupled to the double helix actuator, the controller generating and sending a drive signal to the double helix actuator to drive the proof mass into motion, the drive signal being adjusted by the controller based on one or more feedback signals that are generated in response to the motion.

7. The double helix actuator of claim 6, wherein the feedback signals include a back-electromotive force (EMF) voltage signal generated in response to the motion.

8. The double helix actuator of claim 6, further comprising one or more magnetic sensors proximate to the proof mass, and wherein the feedback signals include voltage signals generated by the one or more magnetic sensors in response to the motion.

* * * * *